Fig. 4

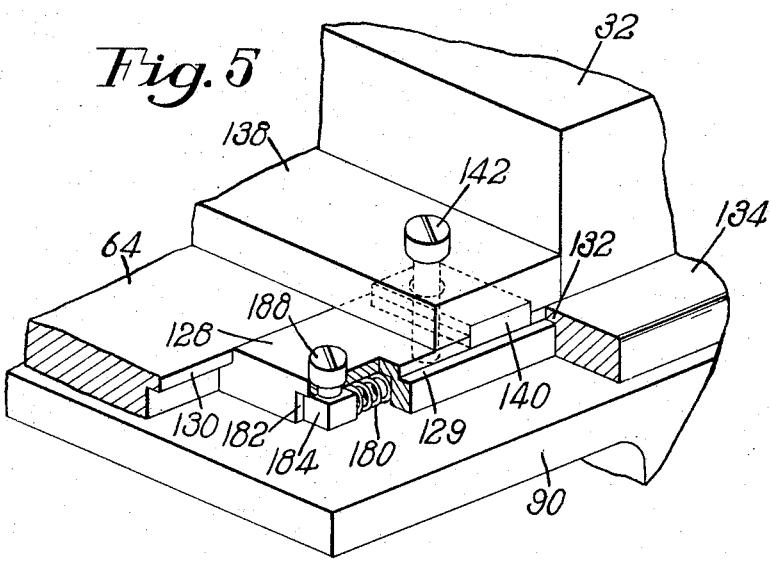
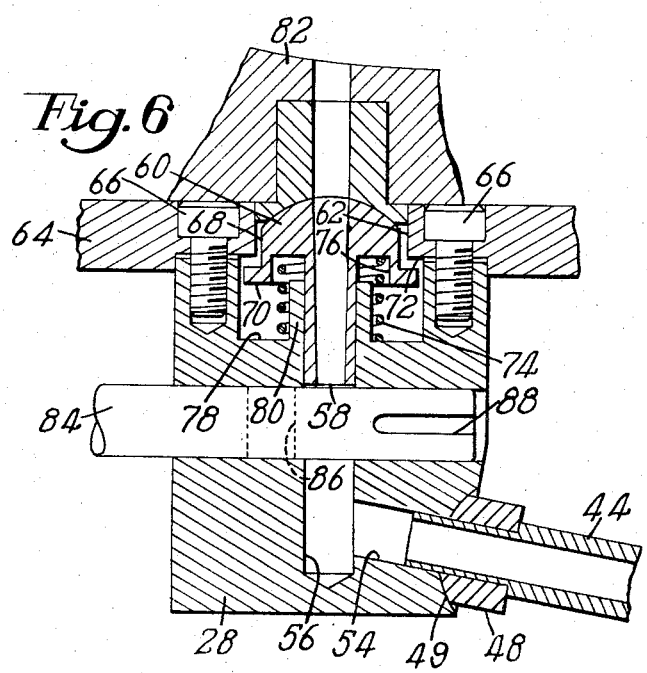

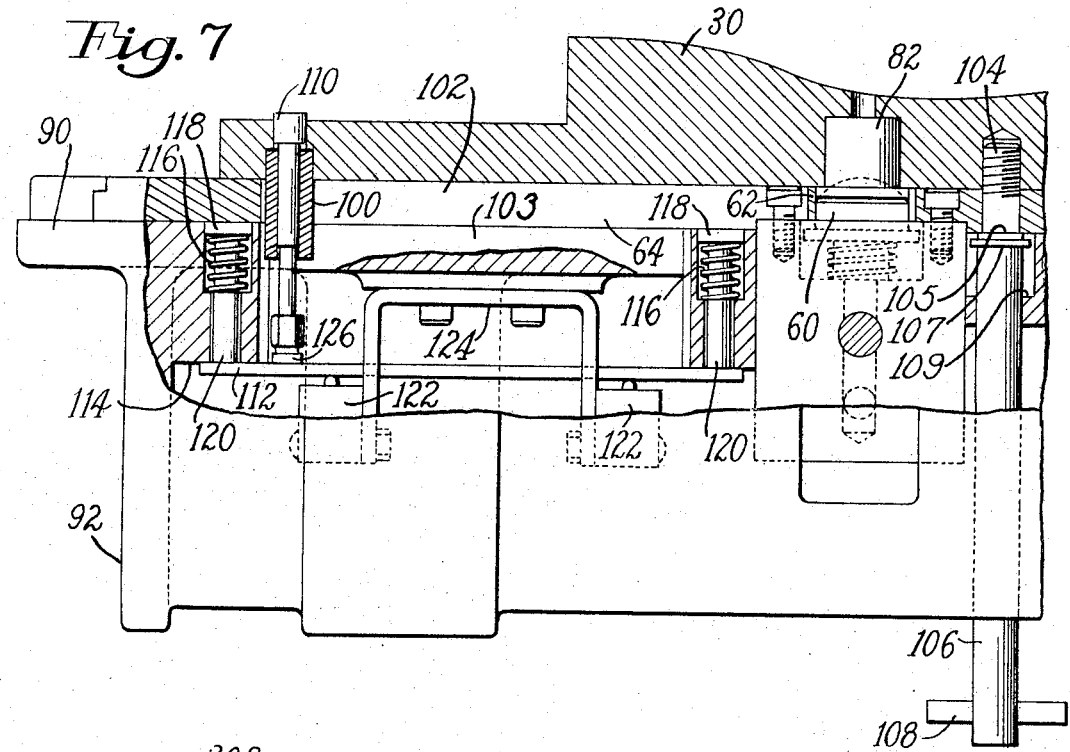
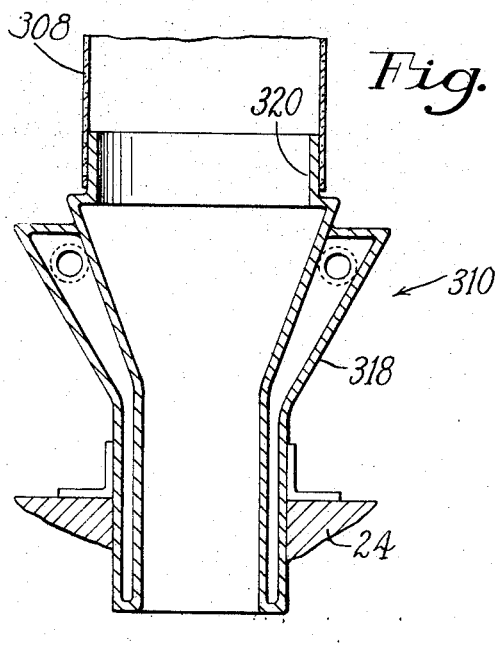

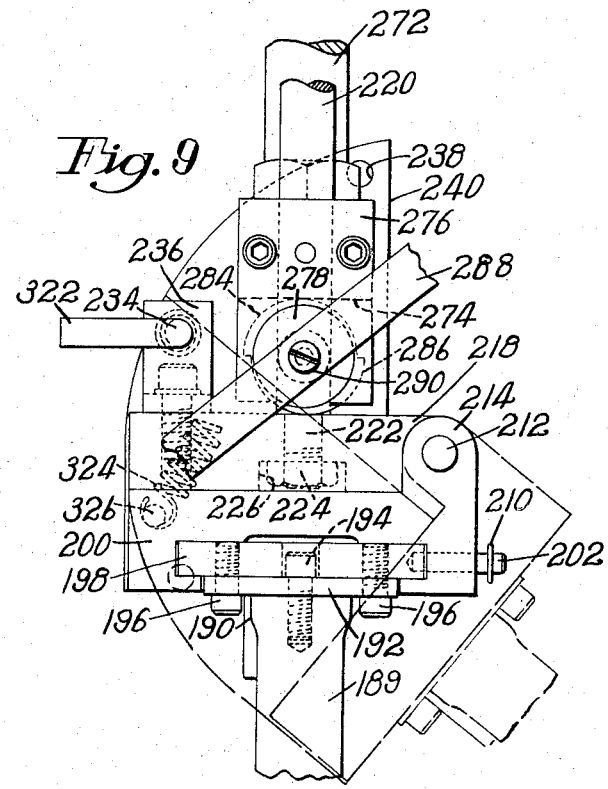
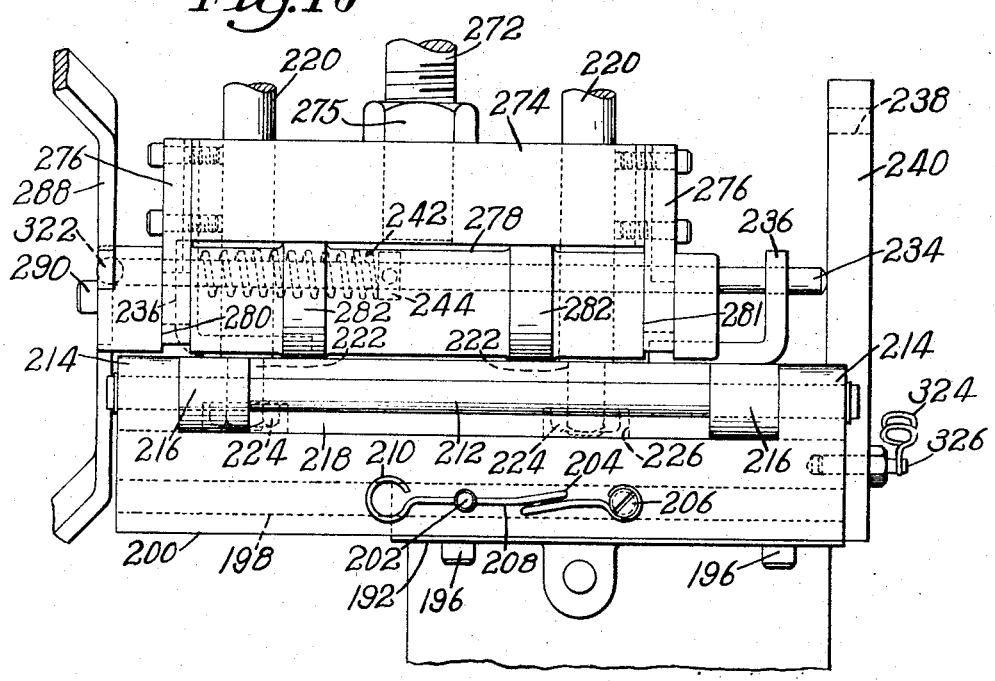

United States Patent Office 3,339,236
Patented Sept. 5, 1967

3,339,236
INJECTION SOLE MOLDING MACHINES
Leslie C. Battell, Paul W. Senfleben, and Walter W. Yarrison, Beverly, Mass., assignors to United Shoe Machinery Corporation, Flemington, N.J., a corporation of New Jersey
Filed Aug. 7, 1964, Ser. No. 388,070
2 Claims. (Cl. 18—17)

ABSTRACT OF THE DISCLOSURE

An injection sole molding machine having a mold assembly including a footform for receiving a lasted footwear upper. Means are provided for moving the footform into cooperative relationship with the remainder of the mold assembly in two stages. A first footform moving means moves the footform with an upper mounted thereon to a position proximate to the remainder of the mold assembly. A second footform moving means operates to move the footform and the mounted upper into snug engagement with the remainder of the mold assembly so as to enclose a mold cavity having the shape of a footwear sole.

---

This invention relates to injection molding machines and is herein illustrated in its application to machines for molding and attaching sole and heel units to the bottoms of lasted footwear. A machine of this type is disclosed, for example, in United States Letters Patent No. 3,006,-032, granted Oct. 31, 1961, on an application filed in the names of Willard L. Baker et al. While the invention is herein illustrated in its application to machines for molding and attaching sole and heel units to the bottoms of lasted footwear, it is to be understood that the invention is not limited in scope to machines of this type but in certain aspects is applicable generally to injection molding machines.

The patent to Baker et al. above referred to discloses a machine designed for high volume production of shoes having sole and heel units molded in situ thereon. While there is a substantial demand for high volume production machines of this type, there has recently evolved a demand for a machine of this type designed for low volume production. Such a machine would, for example, be more suitable for use in a small shoe factory or in a factory where relatively low volume production of this type of shoe is contemplated.

It is an object of the present invention to provide a machine of this type suited to low volume production in shoe factories where contemplated production of this type of footwear would not be sufficient to maintain the operation of a machine of the type disclosed in the Baker et al. patent at full and efficient capacity. It is a further object of the present invention to provide a low production machine of this type which while efficient in operation and capable of producing quality footwear, is of relatively inexpensive construction and well adapted to use in those countries where relatively low grade footwear is the more usual run of production.

With the above and other objects in view, as will hereinafter appear, the present invention in one aspect thereof contemplates the provision in a machine of the type above referred to of a plasticator which, if desired, may supply each station of a two station machine. The plasticator supplies hot fluid plastic under pressure to the mold cavity through an extensible conduit of novel construction. The conduit comprises a first section preferably tubular in construction of relatively small diameter forming the receiving end portion of the conduit and a second section of relatively large diameter forming the delivering end portion of the conduit. The two sections are arranged in telescoping relation and suitable means is provided for so connecting the two sections together that they are readily adjustable relatively to each other lengthwise thereof. Such a conduit may readily be shortened sufficiently to permit it to be removed bodily from the machine to facilitate the removal therefrom of plastic which has become solidified while the machine remains idle. In accordance with a further feature of the invention there is incorporated in each section of the extensible conduit an abutment member, one of said members being arranged to seat against a suitable socket in the plasticator and the other being arranged to seat against a suitable socket in a housing which mounts the injection nozzle. By extending the conduit the abutment members may be forcibly seated in their sockets so as to prevent the occurrence of undue flash between the abutment members and their sockets.

Features of the invention are to be recognized in the organization of two side mold members provided in each station of the machine. As in the machine illustrated in the Baker et al. patent, the two side mold members move laterally toward each other and close against the edge face of a bottom mold member to define the peripheral contour of the mold cavity. In the illustrated organization the side mold members are slidably mounted on a platen which in turn is fixed to a bed plate. Also secured on the bed plate are two rails which are spaced from the platen and provide defined slideways for two slides to which a side mold member is secured. An abutment member is fixed to the slides and suitable means is provided for clamping the side mold member downwardly against the slides and laterally against the abutment member. For this purpose two clamping members are provided, one for each of the slides, each clamping member comprising a shaft rotatably mounted in the side mold member and having a head at its lower extremity which is characterized by an offset extension constructed to engage an undercut horizontal surface of the slide to clamp the side mold member downwardly against the slide and which upon turning of the shaft exerts a cam action against a vertical surface of the slide thereby to clamp the side mold member laterally against the abutment member. For advancing each side mold member into mold closing position the invention in accordance with a further feature thereof provides two cam members fixed to the platen, one at the front and one at the rear thereof, two parallel arms fulcrumed on the abutment member and so arranged that their free ends register with the two cam members respectively and two cam rolls carried at the free ends of the two parallel arms and arranged to act on the cam surfaces of the fixed cam members during swinging movement of the arms thereby to advance the side mold member into its closed position relatively to the bottom mold member, as hereinbefore described.

In common with machines of the type illustrated in the Baker et al. patent above referred to, the illustrated machine is provided in each station with a footwear form, preferably of the foreshortenable type, for supporting lasted footwear while a sole and heel unit is molded in situ thereon and attached thereto by cement previously applied to the overlasted margin of the footwear and to the insole, if any, to which the overlasted margin is attached. In accordance with a feature of the invention a carrier is provided for the footwear form and means is provided for advancing the carrier in two stages from a retracted position to a mold closing position, the advancing means comprising a toggle which advances the carrier through the first stage of its movement and a cam which advances the carrier through the second stage of its movement. In accordance with a further feature of the invention the carrier for the footwear form is mounted on a pair of shafts and the toggle mechanism is connected to the frame and arranged to act against a crosshead slidably mounted on the shafts. The cam member in turn, after the straightening of the toggle, acts between the crosshead and the carrier and against the pressure of spring means constantly urging the shafts upwardly. In accordance with a further feature of the invention the means for mounting the footwear form constitutes a sub-assembly which is mounted in an independent structure insertable between frame sections of the machine, suitable means being provided for the registration of the sub-assembly between the frame sections and other means being provided for securing the structure with the sub-assembly mounted therein to the frame sections.

The cam means for advancing the carrier and the footwear form thereon through the second stage of the advancement of the footwear form into the molding station is preferably manually operated to advance the form into the molding station. In the retraction of the footwear form to its rest position the toggle is broken to elevate the carrier and means operated by the breaking movement of the toggle causes the retraction of the cam member to its rest position and concomitantly with the return of the cam member to its rest position the retraction of the footwear form to its rest position is completed.

These and other features of the invention will now be described with reference to the accompanying drawings and pointed out in the appended claims.

In the drawings:

FIG. 4 is an enlarged view in front elevation partly in section illustrating the mold assembly and associated parts at the left side of the machine;

FIG. 5 is an enlarged perspective view illustrating details of the construction shown in FIG. 4;

FIG. 6 is a section taken substantially on the line VI—VI of FIG. 3 and on a substantially larger scale than FIG. 3;

FIG. 7 is a section taken substantially on the line VII—VII of FIG. 3 and on a scale somewhat larger than in FIG. 3;

FIG. 8 is a section taken on the line VIII—VIII of FIG. 2;

FIG. 9 is an enlarged front elevation illustrating features of the work supporting organization; and FIG. 10 is an enlarged view in side elevation illustrating the features of the work supporting organization shown in FIG. 9.

Figure 1:
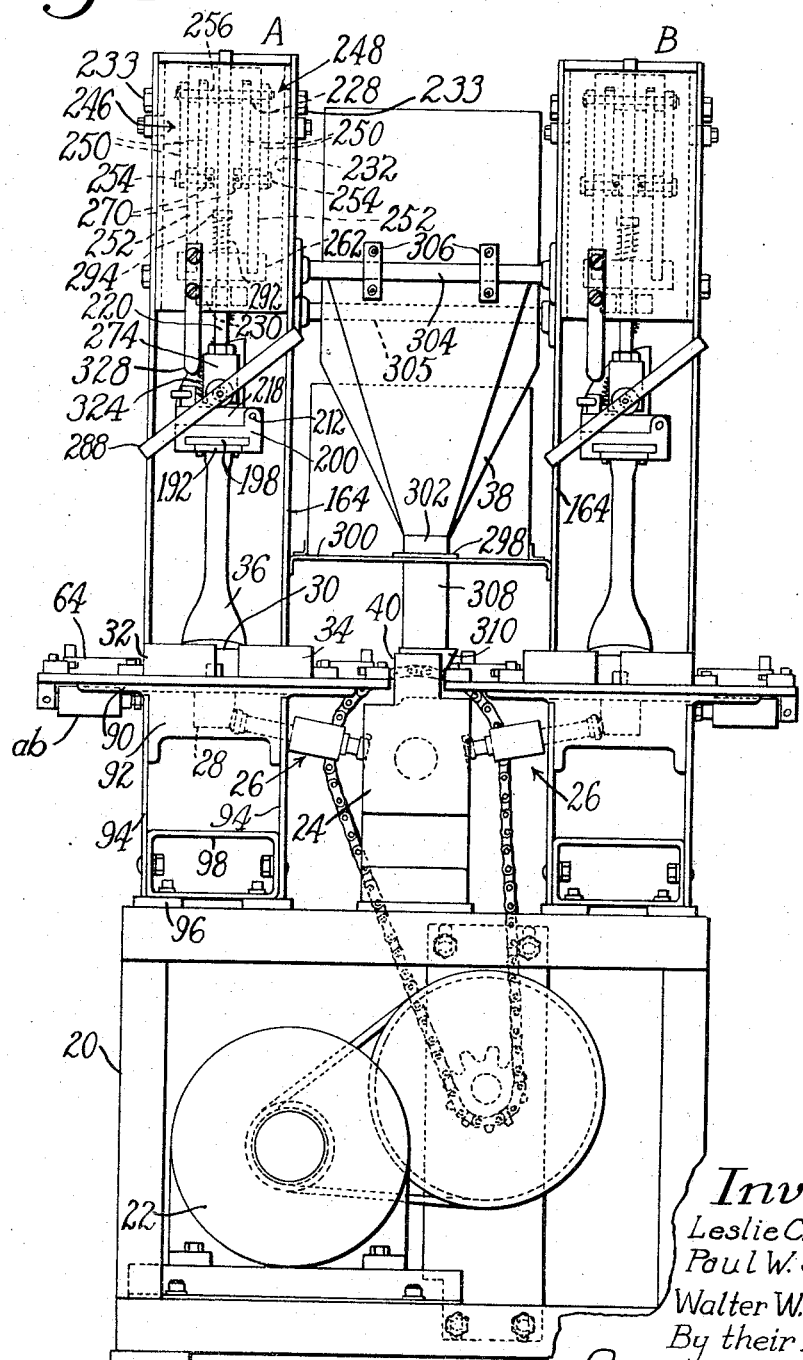
FIG. 1 is a front elevation illustrating a machine embodying the features of the present invention.

Referring to FIG. 1, the invention is illustrated as embodied in a two station machine for injection molding sole and heel units in situ onto shoe bottoms. The drawings illustrate a floor mounted machine having a base frame 20 in which there is mounted an electrical motor 22 from which power is transmitted through a suitable clutch and a chain drive to a plasticator generally indicated by the numeral 24. From a plasticator fluid plastic is transmitted through two telescoping conduits 26 extending in opposite directions each with a slightly upward inclination to two cylindrical housings in two stations of the machine respectively, said stations being identified generally in FIG. 1 by reference characters A and B. The following description will be directed to the construction in station A, but it will be understood that it will be equally applicable to the construction in station B. The telescoping conduit 26 extending to the left from the plasticator 24 connects the plasticator to a cylindrical housing 28 which mounts an injection nozzle hereinafter described. When the passage in the housing from the conduit to the injection nozzle is open, fluid plastic is transmitted through the housing and the nozzle to a mold cavity which is formed by a bottom mold member 30 and two side mold members 32 and 34 and is closed at the top during the mold charging operation by the bottom of a lasted boot mounted on a foreshortenable metal boot form 36.

Figure 4:
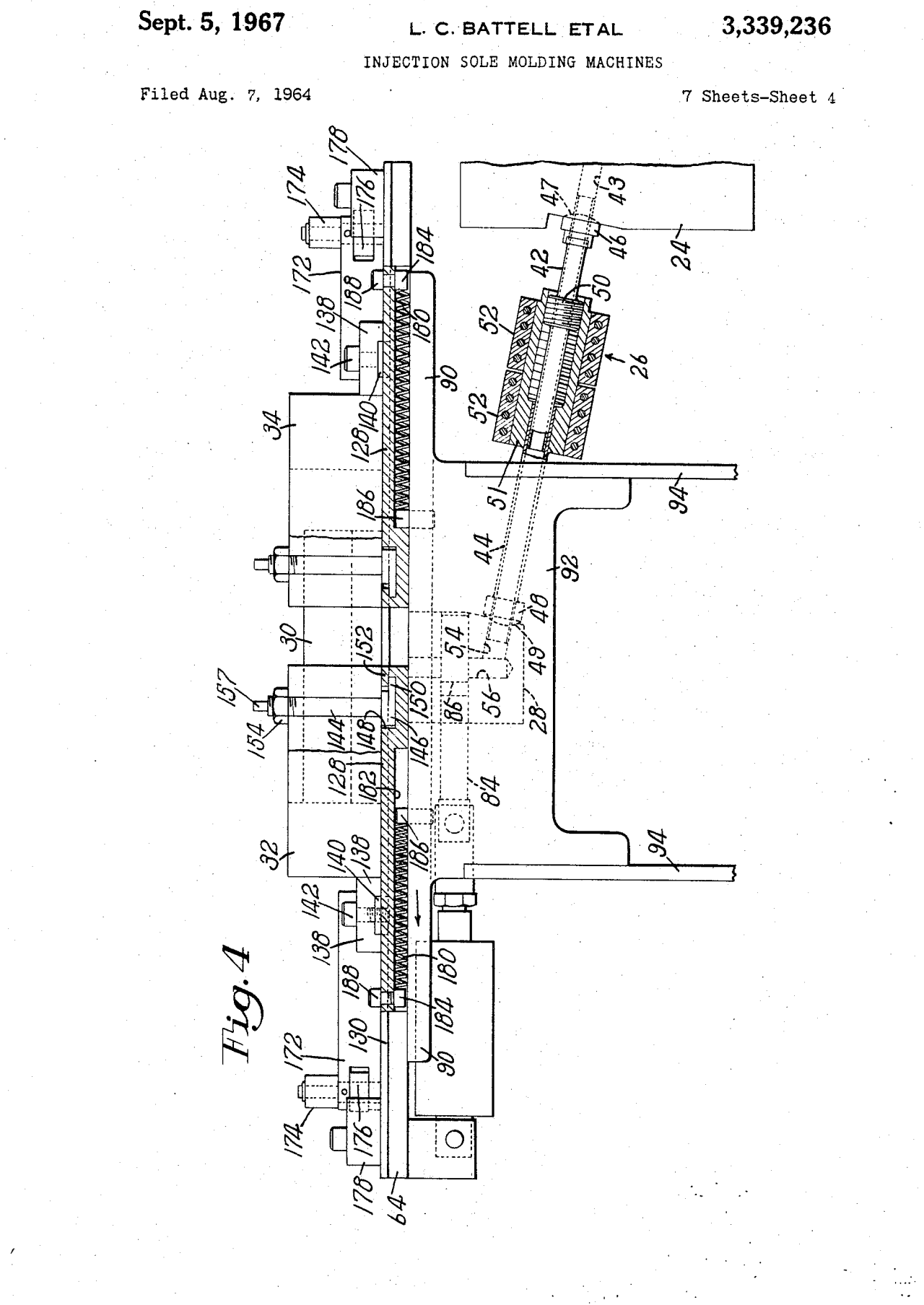

Referring to FIG. 4, the conduit 26 comprises a receiving tubular portion 42 of relatively small diameter which is slidably fitted into a bore 43 in the casing of the plasticator, said bore communicating with the delivery end portion of the plasticator cylinder. At its left end portion as shown in FIG. 4 the tubular member 42 has telescoping engagement within a larger tube 44 which is slidably fitted into an inclined bore 54 formed in the housing 28. Mounted on the tubular member 42 near its right end portion is a collar 46 having a convex edge face 47 complemental in shape to a shallow concave socket formed in the casing of the plasticator. Similarly, the tube 44 has fixed thereto near its left end portion a collar 48 having a convex edge face 49 shaped complementally to a shallow concave recess formed in the housing 28. In order to provide for the convenient adjustment of the length of the conduit 26 to bring the collars into seating engagement with their sockets the tubular member 42 has fixed thereon externally threaded member 50 having threaded engagement within an internally threaded member 51 secured to the tube 44. Mounted on the cylindrical outer surface of the member 51 are suitable thermostatically controlled band heaters 52. The bore 54 within which the tube 44 is received communicates with an axial bore 56 which extends upwardly through the housing 28 and is open at its upper extremity to receive in sliding engagement the cylindrical stem 58 (FIG. 6) extending downwardly from the head 60 of an injection nozzle. The head 60 is positioned within a cylindrical opening 62 in a fixed horizontal platen 64 to which the housing 28 is secured by headed screws 66. The outer wall 68 of the head 60 is cylindrical in shape and somewhat less in diameter than the cylindrical opening 62 in the platen. At its base the head 60 has an outwardly extending annular flange 70 which seats against the base of a counterbore 72 in the platen 64 when the bottom mold member is removed from the machine. The head 60 is urged upwardly by a spring 74 which is confined between the base of a bore 76 in the lower portion of the head 60 and the base of a bore 78 formed in the housing 28. The spring surrounds a tubular extension 80 rising from the base of the bore 78. Referring to FIG. 7 the convex upper surface of the head 60 has mating engagement with the complementally shaped bottom face of a sprue plug 82 mounted in the bottom mold member 30. Referring to FIG. 6, a gate valve is provided in the axial bore 56 in the housing 28 and comprises a cylindrical sliding shaft 84 mounted in a diametrical bore extending through the axial bore 56. The shaft 84 has formed therein a vertical diametrical bore 86 which registers with the axial bore 56 when the valve is in its open position, the shaft 84 being held against turning movement by a spline (not shown) operating in a splineway 88.

Referring to FIG. 4, the platen 64 is mounted on a bed plate 90 having downwardly extending side portions, one of which is identified in FIG. 4 by the numeral 92. At opposite ends thereof the side portions are secured to standards herein illustrated as vertical plates 94 extending upwardly from a base plate 96 (FIG. 1) mounted on the top of the base frame 20. The standards are held fixed by their attachment to a tubular reinforcing structure 98 rectangular in cross section and secured to the base plate 96.

Referring to FIG. 7 the bottom mold member 30 is mounted on the platen 64. The illustrated bottom mold member together with the side mold members 32 and 34 hereinbefore referred to are substantially the same in their construction as the mold elements described in the Baker et al. Patent No. 3,006,032, hereinbefore referred to. The illustrated bottom mold member is located in a predetermined position on the platen 64 by the engagement of the outwardly flanged bottom portion of the sprue plug 82 with the wall of the opening 62 in the platen and by the registration of a cylindrical member 100 mounted in and extending downwardly from the bottom mold member within a slot 102 formed in the platen 64 and a similar slot 103 in the bed plate 90. The slot 102 is extended lengthwise as required for varying locations of the cylinder 100 in different sizes of bottom mold members. It will be understood that the bottom mold member illustrated in FIG. 7 is designed to mold a sole on a large sized men's shoe. The bottom mold member is secured against upward movement from the platen 64 by a clamping screw 104 the reduced upper end portion of which is threaded for engagement in a tapped bore in the base of the forepart of the bottom mold member. The clamping screw has formed therein a shoulder 105 which bears against the base of the platen in order to clamp the bottom mold member to the upper surface thereof. Formed in the clamping screw is a peripheral flange 107 which engages the base of a recess 109 in the bed plate 90 when the screw is disengaged from the bottom mold member and prevents removal of the clamping screw from the machine. To facilitate manual operation of the clamping screw it has a downwardly extending shank portion 106 and a cross bar 108 is incorporated in its lower end portion.

Figure 3:
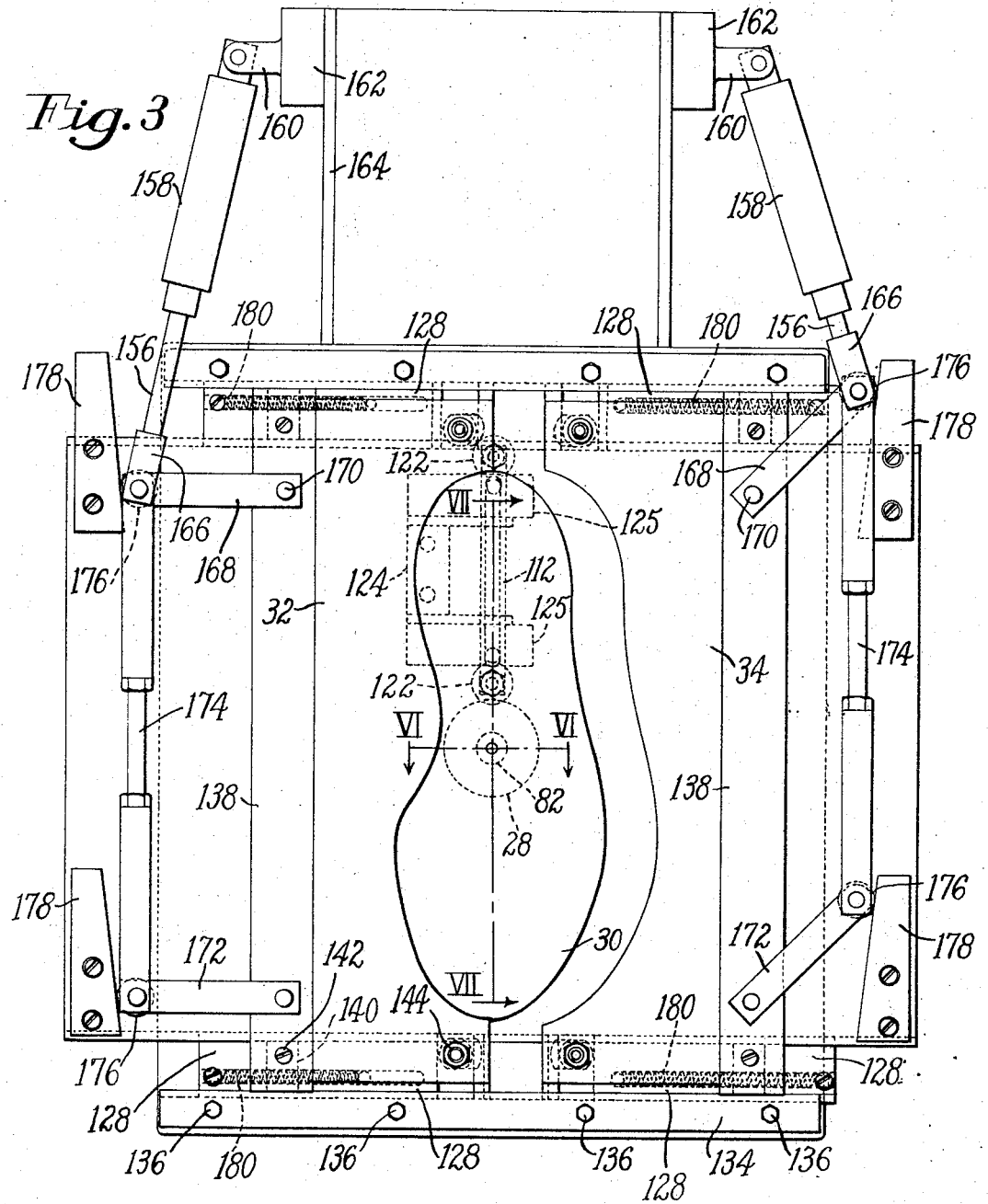
FIG. 3 is a plan view on a larger scale than in FIGS. 1 and 2 illustrating features of the mold assembly.

In order to cause the termination of the injection cycle upon the completion of the charging of the mold cavity a headed plunger 110 has its shank portion slidably mounted in an axial bore in the cylinder 100 and has its head slidably mounted in a concentric bore in the heel end portion of the bottom mold member. The plunger is actuated by the pressure of fluid plastic in the mold cavity to cause the termination of the injection cycle at the appropriate time. The plunger 110 and its associated mechanism are similar in principle to the means provided in the machine of the Baker et al. patent above referred to for terminating the charging of the mold cavity. Briefly described, this mechanism comprises a horizontal plate 112 which is normally held against a surface 114 of the bed plate by two springs 116 mounted in counterbores in the bed plate and bearing against heads 118 of vertical pins 120 extending upwardly from opposite end portions of the plate 112 through oversized bores in the bed plate. The depression of the plunger 110 by the pressure of fluid plastic in the mold cavity causes the plate 112 to operate one or the other of two microswitches 122, depending upon the position of the cylinder 100 lengthwise of the slot 102. The operation of either microswitch causes the termination of the mold charging cycle. It will be seen that the two microswitches are secured to opposite side portions of a yoke 124 secured to the bed plate 90. As illustrated in FIG. 3 the yoke 124 is offset to the left relatively to the plate 112 and has opposite arms 125 extending horizontally beneath the plate 112 and providing mounting means for the microswitches 122. As shown in FIG. 7, the vertical position of the plunger may be varied by adjusting a foot 126 carried by the lower portion of the plunger.

Referring to FIGS. 4 and 5, the side mold members 32 and 34 are mounted for horizontal sliding movement toward and from each other upon the plane upper surface of the platen 64, the mutually closed position of the side mold members being determined by the engagement of their plane vertical inner side faces with each other and by the engagement of the contoured walls of the side mold members with the complementary contoured edge face of the bottom mold member 30. To provide for the transfer of the side mold members between their open position illustrated in FIG. 3 and their closed position position (not shown) the opposite end portions of the mold members are secured to sliding plates 128 mounted on the bed plate 90 for rectilinear movement widthwise of the mold assembly. Inasmuch as the slides and their associated parts are similar in construction and operation, the following description of the forward assembly at the left side as seen in FIG. 3 will apply to all four assemblies. Referring to FIG. 5 the slide 128 is rabbeted at 129 to receive a lip 132 extending rearwardly from a narrow plate or rail 134 secured by headed screws 136 (FIG. 3) to the bed plate 90. To provide for the location of the side mold member 32 widthwise thereof relatively to the slide 128, an abutment plate 138 (FIG. 3) extends from front to back of the mold assembly. Referring to FIG. 5 the plate 138 is positioned upon the sliding plate 128 by a key herein illustrated as a short plate 140 extending upwardly into a suitable groove in the plate 138 and downwardly into a suitable cross groove in the sliding plate 128. The abutment plate is attached to the sliding plate 128 by a headed screw 142 extending downwardly through an oversized bore in the key plate 140 and into a tapped bore in the sliding plate 128. For securing the side mold member 32 to the sliding plate 128 a vertical shaft 144 (FIG. 4) is rotatably mounted in a bore in the side mold member and has at its lower extremity a head 146 seated in a groove 148 in the right end portion of the sliding plate 128. Projecting outwardly from the head 146 is an ear 150 of reduced thickness which when the shaft is turned engages the bottom surface of a lip 152 formed in the sliding plate 128. After the ear has been positioned beneath the lip as shown in FIG. 4, the side mold member may be clamped to the sliding plate 128 by turning a nut 154 on the threaded upper end portion of the shaft 144. In assembling the side mold member 32 with the sliding plate 128 the shaft 144 with the head 146 fixed thereto is moved upwardly through the bore in the side mold member and the nut 154 is loosely mounted on the upper end portion of the shaft. Thereupon, the shaft is turned so that the ear 150 extends forwardly as seen in FIG. 3 and the head 146 is inserted into the groove 148 in the sliding plate 128. A suitable wrench is then brought into engagement with the slabbed off upper end portion 157 of the shaft 144 and the shaft is turned in a counterclockwise direction as seen in FIG. 3 causing the ear to exert a cam action against the sliding plate 128 thereby to clamp the side mold member forcibly against the abutment plate 138. Thereupon the nut 154 is tightened against the upper surface of the side mold member 32 to secure the head 146 in its clamping position and to clamp the side mold member against the upper surface of the sliding plate 128.

Referring to FIG. 3, the side mold members are advanced into their mutually closed position by the concomitant operation of two pneumatic pistons 156 which operate in cylinders 158 pivotally mounted at their rear extremities between ears 160 projecting outwardly from blocks 162 fixed to the vertical frame plate 164. At its forward extremity each piston rod carries a yoke 166 within which there is pivotally mounted an arm 168 fulcrumed on a pin 170 mounted in the abutment plate 138. Also fulcrumed on the abutment plate is an arm 172 corresponding to the arm 168 and arranged parallel thereto, the two arms being interconnected at their free ends by an expansible link 174. Each of the arms 168 and 172 carries a cam roll 176 which acts against a fixed cam plate 178 during forward movement of the arms 168 and 172 thereby to advance the side mold members concomitantly into their mold closing positions as shown at the left side of FIG. 3. For returning the side mold members 32 and 34 to their respective retracted or open positions there are provided for each side mold member two parallel springs 180. As shown in FIGS. 4 and 5 each spring is mounted in a longitudinal groove 182 in the bottom of one of the sliding plates 128 and is confined between a square nut 184 and a pin 186 projecting upwardly from the bed plate 90, the nut 184 being secured in the groove 182 by a bolt 188. It will be seen that mold closing movement of the side mold member 32 compresses or loads the spring 180 preparatory to the mold opening operation.

Figure 2:
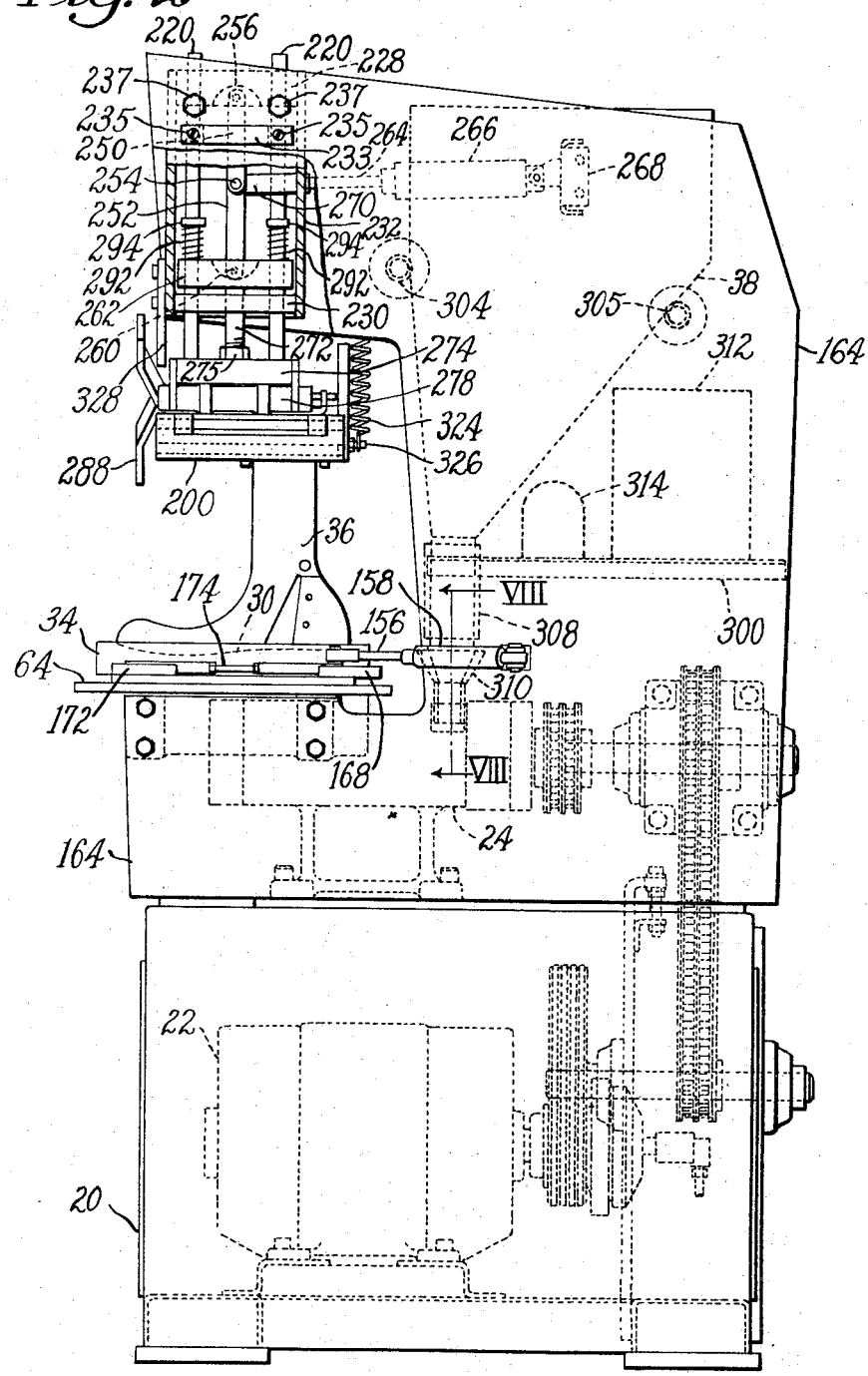
FIG. 2 is a right side elevation of the machine illustrated in FIG. 1.

As shown in FIG. 2, the illustrated machine is provided with a work supporting form 36 of a foreshortenable type constructed to receive boots of medium height. As shown in FIG. 9, the illustrated boot form has a shank portion 189 which terminates at its upper extremity in a head 190 having a plane upper surface to which a plate 192 is secured by headed screws 194. The plate 192 is secured by headed screws 196 to an overlying plate 198 which is substantially wider than the plate 192 as shown in FIG. 9 and provides in combination with the plate 192 a T structure which is receivable in a T-way formed in a block 200. In the illustrated organization the boot form is mounted in the block 200 by a toeward movement thereof from the rear opening of the T-way. The position of the boot form longitudinally in the T-way is determined by a locking pin 202 slidably mounted in a suitable bore at the right side of the block 200 as seen in FIG. 9, the bore being so arranged that the locking pin registers with a suitable socket in the right side portion of the plate 198. As shown in FIG. 10 the locking pin is urged into locking position by a torsion spring 204 which is secured to the right side wall of the block 200 by a headed screw 206 extending through a terminal loop in the spring. Formed in the spring is a leg 208 which extends through a bore in the locking pin 202. At its left extremity as seen in FIG. 10 the spring has formed therein a loop 210 conveniently arranged to provide a finger grip to facilitate the manual retraction of the locking pin from the socket in the plate 198 to permit removal of the boot form from the block 200. The plate 198 fits relatively freely in the T-way in the block 200 so that there is afforded a limited adjustment of the boot form to register it accurately relatively to the side mold members, or more specifically, to the mold cavity defined by the contoured walls of the side mold members. As shown in FIG. 9, the block 200 is mounted on a hinge pin or shaft 212 for swinging movement between its full line position and its broken line position illustrated in FIG. 9. The shaft 212 extends through lugs 214 formed in the block 200 and through lugs 216 extending laterally from the right side of a mounting plate 218 which is above and contiguous to the block 200 when the block is in its full line position shown in FIG. 9. The block 200 is held against side play by the engagement of the lugs 214 with the outer side faces of the lugs 216. The plate 218 is mounted on two parallel vertical sliding shafts 220 and to that end the plate is drilled to receive the reduced lower end portions 222 of the shafts. For clamping the plate 218 against the shoulder at the junction of the two diameters of each shaft a clamping nut 224 is mounted on the threaded lower end portion of each shaft and is seated against the base of a counterbore 226 formed in the plate 218. Referring to FIG. 2, the shafts 220 are slidably mounted in suitable bearings in fixed crossheads 228 and 230. In the illustrated construction the crossheads are fixed in a vertical tubular structure 232 which is rectangular in cross section and is secured to forward extensions of the parallel frame plates 164. As shown in FIGS. 1 and 2, a horizontal tongue and groove structure is provided for mounting the tubular member 232, said structure comprising two tongue members 233, one on each of the two side frame plates 164. Referring to FIG. 2, each tongue member is a horizontal bar which extends through a horizontal slot in the frame member 164 and into a suitable groove in the tubular member 232. For attaching the tongue member to the outer face of the frame plate 164 said tongue member has ears extending from opposite ends thereof and apertured to receive headed screws 235. For holding the tubular member 232 against movement endwise of the tongue members 233, four headed screws 237 (FIG. 2) extend through suitable bores in the frame plate 164 and into tapped holes in the tubular member.

When the machine is at rest the work supporting assembly is held against downward movement from the loading position by a toggle mechanism hereinafter described. The boot form 36 is held in its loading position, generally indicated by broken lines in FIG. 9, by a locking pin 234 slidably mounted in bearings in two angle brackets 236 secured to the plate 218 and arranged to enter a bore 238 formed at the upper extremity of an upward extension 240 of the plate 218, said extension as shown in FIG. 9 being in the form of an abbreviated quadrant having its axis concentric with the shaft 212. The locking pin is urged into the bore 238 by a spring 242 (FIG. 10) surrounding the pin and confined between the left bracket 236 and a collar 244 fixed to the pin.

The boot form is advanced from its retracted or elevated position as shown in FIG. 1 into its position in the molding station as shown in FIG. 2 in two stages. In the first stage a toggle mechanism now to be described advances the boot form into close proximity to the upper surface of the side mold members and in the second stage a cam mechanism hereinafter described completes the advancement of the boot form and presses the bottom margin of a lasted boot thereon forcibly against the side mold members. Referring to FIG. 1, the illustarted toggle structure comprises a pair of toggle units 246 and 248 vertically disposed in parallel relation to each other, each toggle comprising a pair of upper links 250 and a single lower link 252 positioned between the upper links and pivoted thereto by a cross pin 254. At this upper extremities the links 250 are pivotally mounted on a cross shaft 256 mounted in the crosshead 228, the crosshead being suitably grooved to receive the upper end portions of the links. The lower end portion of the link 252 is pivotally mounted on a cross shaft 260 (FIG. 2) fixed in a carrier plate 262 slidably mounted on the vertical shafts 220, the carrier plate being suitably grooved to receive the lower end portions of the links 252. For simultaneously actuating the toggle assemblies 246 and 248 a piston identified in FIG. 2 by a piston rod 264 is mounted in a cylinder 266 hinged on a fixed bracket 268. At its forward end the piston rod carries a yoke 270 which is fixed to the inner end portions of the two cross pins 254 (FIG. 1). Referring to FIG. 2, an adjustable spacer herein illustrated as a vertical shaft 272 is threaded into and extends upwardly from a crosshead 274 to which it is fixed by a lock nut 275. At its upper extremity the shaft 272 abuts the carrier plate 262 and determining the space relation between the carrier plate and the crosshead 274. By adjusting the position of the shaft 272 in the crosshead the vertical relation between the boot form 36 and the mold elements can be varied as required. Secured to opposite end portions of the crosshead 274 are two bearing plates 276 (FIG. 10) which extend downwardly from the crosshead and are vertically slotted to provide bearings for a rotary cam member 278 which in its operation moves vertically bodily within said slots. The cam member is grooved annularly at 280 and 281 and the slotted end portions of the bearing plates are received within said grooves. The cam member, as shown in FIG. 10, has two cam elements incorporated therein each of which, as shown in FIG. 9, has an upper cam surface 284 and a lower cam surface 286. The upper cam surface bears against the bottom face of the crosshead 274 and the lower cam surface bears against the upper face of the plate 218. It will be seen that rotation of the cam member 278 in a clockwise direction as seen in FIG. 9 forces the plate 218 downwardly and consequently causes downward movement of the boot form 36 thereby to bring the lasted margin of a boot on the form downwardly forcibly against the upper surfaces of the side mold members. The cam is rotated manually by means of a double hand lever 288 seated in a diametrical groove in the forward end portion of the cam member and is secured therein by a headed screw 290. The boot supporting assembly is constantly urged upwardly by two springs 292 (FIG. 2) surrounding respectively the two shafts 220, each spring being confined between a collar 294 fixed to the shaft and the upper surface of the carrier plate 262. It will be seen that movement of the cam member 278 in a counterclockwise direction as seen in FIG. 9 is accompanied by expansion of the springs 292 thereby elevating the boot form relatively to the side mold members. In so doing, the springs 292 maintain a constant contact of the cam member with plate 218 and with the crosshead 274.

The hopper 38 which supplies plastic in granular or powdered form to the plasticator 24 is supported by a flange 298 (FIG. 1) upon a shelf 300 fixed to the innermost of the frame plates 164. In the illustrated organization the flange 298 which is annular in structure extends outwardly from a neck 302 projecting downwardly from the lower extremity of the hopper. The upper portion of the hopper is braced by its attachment to two crossbars 304 and 305 interconnecting the inner frame plates 164, suitable fastening means, herein illustrated as clips 306, being provided for attaching the hopper to the crossbars. A flexible fabric tubing 308 surrounds and is attached to the neck of the hopper and extends downwardly into the mouth of a funnel 310 which, as generally indicated in FIG. 2, is fixed within a suitable opening in the casing of the plasticator. In order to prevent the elevation of the temperature within the funnel 310 sufficiently to cause the melting of plastic therein, a suitable cooling system is incorporated in the funnel. As illustrated in FIGS. 2 and 8, the desired cooling is effected by a recirculating water system comprising a water tank 312 generally indicated in FIG. 2 and supported upon the shelf 300, a pump enclosed by a casing 314 mounted on the shelf and arranged to effect a continuous flow of water between the tank and a water jacket 318 surrounding the funnel 310. As shown in FIG. 8 the funnel 310 has incorporated therein a neck 320 extending upwardly and adapted to receive within it the lower portion of the fabric tubing 308.

Preparatory to the operation of the machine suitable band heaters surrounding the casing of the plasticator 24 are activated to bring the plasticator up to operating temperature as are also the band heaters 52 which embrace the internally threaded member 51 incorporated in the tube 44. Heating of the member 51 is required to insure the maintenance of the plastic in fluid condition permitting its passage through the conduit 26 to the housing 28 which is also heated by a suitable band heat (not shown). The heating of the member 51 causes some endwise expansion of the conduit 26. In order to prevent possible damage to the conduit during such expansion thereof the head 50 of the tube 42 is screwed into its socket one or two turns to shorten the conduit prior to the activation of the band heaters 52 and after the conduit has been heated to required temperature, it is extended by a reversed movement of the head 50 in order to seat the collars 46 and 48 firmly against their sockets.

The two stations of the illustrated machine are operated in tandem so that a molded sole may be solidifying in one station while a sole is being injected onto a boot bottom in the other station. In the operation of the machine the operator mounts a boot corresponding in size and style to the boot forms in the machine in that form which is retracted and swung into its rest position. The boot will preferably be flat lasted and the overlasted margin will have been roughed and coated with a suitable adhesive for its attachment to a sole and heel unit which will be molded in situ onto the lasted boot bottom in the operation of the machine. It will be understood that the boot form is foreshortened for the mounting of the boot thereon and after the boot is properly positioned thereon the boot form is extended to fill the boot and to support it for the sole molding operation. After so extending the boot form the operator grasps an offset finger grip 322 (FIG. 9) of the locking pin 234 and retracts the pin to permit the boot form to be swung downwardly and to the left into its vertical position by a spring 324 which is anchored at its lower end to a pin 326 projecting rearwardly from the left end portion of the block 200 and at its upper end to a suitable pin (not shown) extending inwardly from the right frame plate 164. A valve is now operated manually to cause the side mold members 32 and 34 which are initially in their open position to be closed against the edge face of the bottom mold member 30 thereby to form the cavity within which the sole and heel unit is to be molded. The operator then manually operates a second valve to effect the operation of the toggle mechanism which advances the bottom mold member and the boot thereon through the first stage of its downward movement. Thereupon the operator swings the double hand lever 288 in a clockwise direction as seen in FIG. 1 thereby to actuate the cam member 278 (FIG. 9) which moves the boot form through the second stage of its downward movement and presses the marginal portion of the overlasted margin of a boot thereon forcibly against the inner margins of the side mold members 32 and 34 thereby completing the closure of the mold cavity preparatory to the injection molding of a sole and heel unit in situ onto the boot bottom. Thereupon a valve is manually operated to cause the movement of the gate valve 84 to the right as seen in FIG. 6 in order to open a passage from the plasticator to the mold cavity. The movement of the gate valve automatically causes the operation of a valve which in turn causes the engagement of the clutch connecting the motor 22 to the plasticator 24. Upon the completion of the charging of the mold cavity the pressure of the fluid plastic in the cavity causes downward movement of the plunger 110 (FIG. 7) thereby operating one of the microswitches 122 which causes the operation of a valve which effects the closing of the gate valve and the disengagement of the clutch thereby to terminate the injection cycle. Upon the completion of the cycle of a timer which measures the duration of the solidifying time for the newly molded sole and heel unit a switch is automatically operated to effect the operation of a valve to cause the retraction of the pistons in the two cylinders 158 (FIG. 3), thereby retracting the cam arms 168 and 172 and permitting the springs 180 to return the side mold members 32 and 34 to their open positions. The piston 264 (FIG. 2) is now operated to break the toggle and elevate the boot form 36. During the upward movement of the boot form the left end portion of the double hand lever 288 engages an abutment arm 328 projecting downwardly from the tubular member 232 thus causing rotation of the cam member 278 in a counterclockwise direction as seen in FIG. 1 thereby to return said cam member to its rest position. The boot form is now swung upwardly to the right as seen in FIG. 1 to its rest position in which it is locked by the pin 234 (FIGS. 9 and 10). The boot form is now foreshortened and the boot with a sole and heel unit newly molded thereon is removed from the boot form.

In the event that the illustrated machine is used in molding sole and heel units onto the bottom of shoes, as distinguished from boots, a suitable spacer (not shown) is mounted in the block 200 and the shoe form is mounted on the spacer.

Having thus described our invention, what we claim as new and desire to secure by Letters Patent of the United States is:

1. An injection molding machine for molding soles onto lasted footwear, said machine comprising a frame, at least one mold assembly mounted on said frame, said mold assembly comprising a bottom mold member, side mold members movable to engage the bottom mold member, and a top mold member comprising a footform for receiving a lasted upper, said machine further comprising carrier means disposed on said frame for mounting said footform, first moving means attached to said frame and operable to move said carrier means from a first position remote from the mold assembly to a second position wherein said top mold member is proximate to said side mold members when said side mold members are in the bottom mold engaging position, a second moving means mounted on said frame and operable to move said carrier means to a third position wherein said lasted upper is in sealing engagement with said side mold members, said second means comprising a rotary cam, a cam follower in engagement with the periphery of said rotary cam and connected to said carrier means whereby upon rotation of said cam said carrier means is caused to move to said third position whereby to enclose a mold cavity having the configuration of a footwear sole, means for adjusting the space relation between the foot form and the remainder of the mold assembly, said adjusting means comprising means for locating said cam and said cam follower at a predetermined distance from said remainder of the mold assembly and means for injecting molten sole material into said cavity whereby to form a molded sole on the upper mounted on said footform.

2. The invention according to claim 1 in which said first moving means comprises toggle means.

References Cited

UNITED STATES PATENTS

| | | |
|---|---|---|
| 2,111,857 | 3/1938 | Jeffery. |
| 2,113,115 | 4/1938 | MacMillin et al. |
| 2,711,567 | 6/1955 | Knapp _____ 18—30 X |
| 2,969,818 | 1/1961 | Allard. |
| 3,014,242 | 12/1961 | Baker et al. _____ 18—17 X |
| 3,015,848 | 1/1962 | Hollfritsch _____ 18—30 |
| 3,018,517 | 1/1962 | Ludwig _____ 18—17 |
| 3,048,893 | 8/1962 | Choice _____ 18—17 |
| 3,058,152 | 10/1962 | Eldred et al. _____ 18—17 |
| 3,166,790 | 1/1965 | Keyes _____ 18—16 X |
| 3,189,943 | 6/1965 | Choice et al. _____ 18—17 |
| 3,203,049 | 8/1965 | Brown et al. _____ 18—17 |
| 3,224,037 | 12/1965 | Robbins et al. _____ 18—38 X |
| 3,262,158 | 7/1966 | Von Reimer et al. _____ 18—30 |

FOREIGN PATENTS

| | | |
|---|---|---|
| 639,348 | 5/1962 | Italy. |

J. SPENCER OVERHOLSER, *Primary Examiner.*

J. HOWARD FLINT, JR., *Examiner.*